United States Patent
Lyons et al.

(10) Patent No.: US 6,411,209 B1
(45) Date of Patent: Jun. 25, 2002

(54) METHOD AND APPARATUS TO SELECT THE BEST VIDEO FRAME TO TRANSMIT TO A REMOTE STATION FOR CCTV BASED RESIDENTIAL SECURITY MONITORING

(75) Inventors: Damian M. Lyons, Putnam Valley; Eric Cohen-Solal, Ossining; Srinivas Gutta, Buchanan; Antonio Colmenarez, Jr., Peekskill, all of NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/730,677

(22) Filed: Dec. 6, 2000

(51) Int. Cl.$^7$ ................................................. G08B 13/00
(52) U.S. Cl. ......................................... 340/541; 348/152
(58) Field of Search .................................. 340/541, 528, 340/547, 545.1, 567, 531; 348/143, 152–155; 379/37, 39, 44

(56) References Cited

U.S. PATENT DOCUMENTS

| | | | | |
|---|---|---|---|---|
| 3,812,287 A | * | 5/1974 | Lemelson .................... | 348/155 |
| 4,198,653 A | * | 4/1980 | Kamin ......................... | 348/155 |
| 5,027,104 A | * | 6/1991 | Reid ............................ | 340/541 |
| 5,396,284 A | * | 3/1995 | Freeman ...................... | 348/154 |
| 5,657,076 A | | 8/1997 | Tapp ........................... | 348/154 |
| 5,831,669 A | | 11/1998 | Adrain ......................... | 348/143 |
| 5,926,210 A | * | 7/1999 | Hackett et al. .............. | 348/158 |
| 5,982,418 A | | 11/1999 | Ely .............................. | 348/153 |
| 6,069,653 A | | 5/2000 | Hudson ....................... | 348/143 |
| 6,069,655 A | | 5/2000 | Seeley et al. ............... | 348/154 |

FOREIGN PATENT DOCUMENTS

| | | |
|---|---|---|
| GB | 2223614 A | 4/1990 |
| GB | 2343945 A | 5/2000 |
| JP | 328405 | 11/1999 |

OTHER PUBLICATIONS

Rowley, H.A., et al., "Human Face Detection in Visual Scenes", Advances in Neural Information Processing Systems 8, Proceedings of the 1995 Conference, pp. 875–881, 1996.

Rowley, H.A., et al., "Rotation Invariant Neural Network–Based Face Detection", Proceedings, 1988 IEEE Computer Society Conference on Computer Vision and Pattern Recognition, pp. 38–44, 1998.

Raja, Y., et al., "Segmentation and Tracking Using Colour Mixture Models", Computer Vision—ACCV '98, Third Asian Conference on Computer Vision, Hong Kong, China, Jan. 1998, Proceedings, vol. 1.

Lee, C.H., et al., "Automatic Human Face Location In A Complex Background Using Motion And Color Information", Pattern Recognition, vol. 29, No. 11, pp. 1887–1889, 1996.

Gutta, S., et al., "Free Surveillance", Sixth International Conference on Computer Vision, The Institute of Electrical and Electronics Engineers, Inc., pp. 646–651.

(List continued on next page.)

*Primary Examiner*—Thomas Mullen
(74) *Attorney, Agent, or Firm*—Gregory L. Thorne

(57) ABSTRACT

A security monitoring system including: an alarm system having detectors for detection of an alarm in a structure; at least one camera for capturing image data inside and/or outside the structure; a processor for selecting a subset of the image data upon the occurrence of the alarm based on a predetermined criteria; and a modem for transmitting the subset of image data to a remote location. Preferably, the processor ranks each video frame from the image data according to how well each video frame meets the predetermined criteria and the modem transmits a predetermined number of video frames having the best rank to the remote location.

20 Claims, 2 Drawing Sheets

OTHER PUBLICATIONS

Stauffer, C., "Automatic hierarchical classification using time–based co–occurrences", IEEE Computer Society Technical Committee on Pattern Analysis and Machine Intelligence, vol. 2, pp. 333–339.

Grimson, W.E.L., et al., "Using adaptive tracking to classify and monitor activities in a site", Proceedings 1988, IEEE Computer Society Conference on Computer Vision and Pattern Recognition, pp. 22–29, 1998.

* cited by examiner

METHOD AND APPARATUS TO SELECT THE BEST VIDEO FRAME TO TRANSMIT TO A REMOTE STATION FOR CCTV BASED RESIDENTIAL SECURITY MONITORING

BACKGROUND OF THE INVENTION

1. Field of the Invention

The present invention relates generally to security monitoring systems and, more particularly, to a security monitoring system in which a video frame from video surveillance cameras is selected for transmission to a remote monitoring station based on a set of predetermined criteria.

2. Prior Art

Security monitoring systems of the prior art, particularly residential security systems, typically utilize a box that monitors contact sensors for doors and windows and one or more infra-red sensors for area monitoring. When a contact is triggered or an infra-red sensor triggers, an alarm is sounded and a signal is sent via a data link such as a phone line to a central monitoring site. The central monitoring site typically initiates a set of phone calls, to the homeowner, to work, and/or to a designated neighbor to determine if the alarm signal was due to an unauthorized intruder or just to an accidental triggering by a family member or other authorized occupant of the structure.

If the alarm signal cannot be resolved by the phone calls, it is passed to the local police department. According to the International Association of Chiefs of Police (www.theiacp.org), alarm calls comprise 10% to 30% of police calls, and 94% to 98% of the calls turn out to be "false alarms" in the sense that they were not due to an unauthorized intruder.

Significant portions (over 70%) of "false alarms" are caused by what is referred to as exit/entrance conflicts. For instance, in the situation of a residential alarm system, the homeowner or other authorized occupant of a residence often arms the security system while leaving the residence and shortly thereafter realizes that they have forgotten something in the residence. As they return to the residence, they enter without disarming the system thereby causing an alarm to be sounded and/or an alarm signal to be sent to a central monitoring site. Similarly, the homeowner may arm the security system and remain inside the residence, such as during the night and may thereafter leave to get something outside the residence, e.g., the morning paper, thereby triggering a false alarm.

In view of the prior art, there is a need for a security monitoring system, which resolves these and other types of entry/exit conflicts.

SUMMARY OF THE INVENTION

Therefore it is an object of the present invention to provide a security monitoring system which reduces the number of false alarms inherent in the prior art security monitoring systems.

It is a further objective of the present invention to provide a security monitoring system which transmits image data to a remote monitoring station for inspection by the monitoring staff to determine if an alarm is a true or false alarm.

It is yet another objective of the present invention to provide a security monitoring system which selects a portion of the image data to the remote monitoring station based upon a set of predetermined criteria such that the bandwidth for transmitting the image data is not exceeded.

Accordingly, a security monitoring system is provided. The security monitoring system comprises: an alarm system having means for detection of an alarm in a structure; at least one camera for capturing image data inside and/or outside the structure; a processor for selecting a subset of the image data upon the occurrence of the alarm based on a set of predetermined criteria; and transmission means for transmitting the subset of image data to a remote location.

Preferably, the at least one camera is a video camera, the image data is video image data, and the subset of the image data is at least one video frame of the video image data. The transmitted image data should be such as to allow a monitoring operator to quickly decide if the alarm is a true alarm or a false alarm. More preferably, the processor ranks each video frame from the image data according to how well each video frame meets a set of predetermined criteria which evaluate how useful they are to a monitoring operator in distinguishing false/true alarms, and the transmission means transmits a predetermined number of video frames having the best rank to the remote location.

One approach to transmitting image data to the remote location is to simply transmit the frame at the time of the alarm, or a set of frames corresponding to some time interval around the alarm time (e.g., transmit an image taken 0.5 seconds before the alarm, at the alarm and 0.5 seconds after the alarm). However, such a scheme is not guaranteed to catch the cause of the alarm, and even if the cause is caught, it may not be portrayed in a form quickly interpretable by the monitoring operator (e.g., the image may catch the heel of an intruder departing through a doorway).

In preferred implementations of the security monitoring system of the present invention, the processor subtracts an established background from each video frame resulting in a difference region. The predetermined criteria that evaluate how useful the image is to a monitoring operator are selected from a group consisting of: how centered the difference region is in the video frame; how large the difference region is in the video frame; whether the difference region consists of a large difference region or a group of smaller difference regions in the video frame; the contrast of the difference region in the video frame; the lighting condition on the difference region in the video frame; and whether a face is detected in the difference region in the video frame. If the predetermined criteria includes whether a face is detected in the difference region of the video frame, further predetermined criteria are preferably selected from a group consisting of: how much of the face is visible in the video frame; whether the face is turned towards of away from the video frame; and whether key features of the face are visible in the video frame.

In alternative implementations of the security monitoring system of the present invention, the predetermined criteria are selected from a group consisting of: whether the video frame is blurred; how much skin color is contained in the video frame; if a person is recognized in the video frame; and the lighting condition on a region of motion in the video frame.

In yet another preferred implementation of the security monitoring of the present invention, the system further comprises: an image recording system for recording the image data to be analyzed by the computer vision system wherein the image data is recorded for a predetermined time period before and after the occurrence of the alarm; an analog to digital converter for converting analog image data to digital image data prior to being analyzed by the processor; and a compression means for compressing the subset of the image data prior to transmission to the remote location.

Also provided are methods for security monitoring of a structure having the security monitoring system of the present invention.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention is applicable to numerous and various types of security monitoring systems and image data, it has been found particularly useful in the environment of residential security monitoring systems and video image data. Therefore, without limiting the applicability of the invention to residential security monitoring systems and video image data, the invention will be described in such environment.

Figure 1:
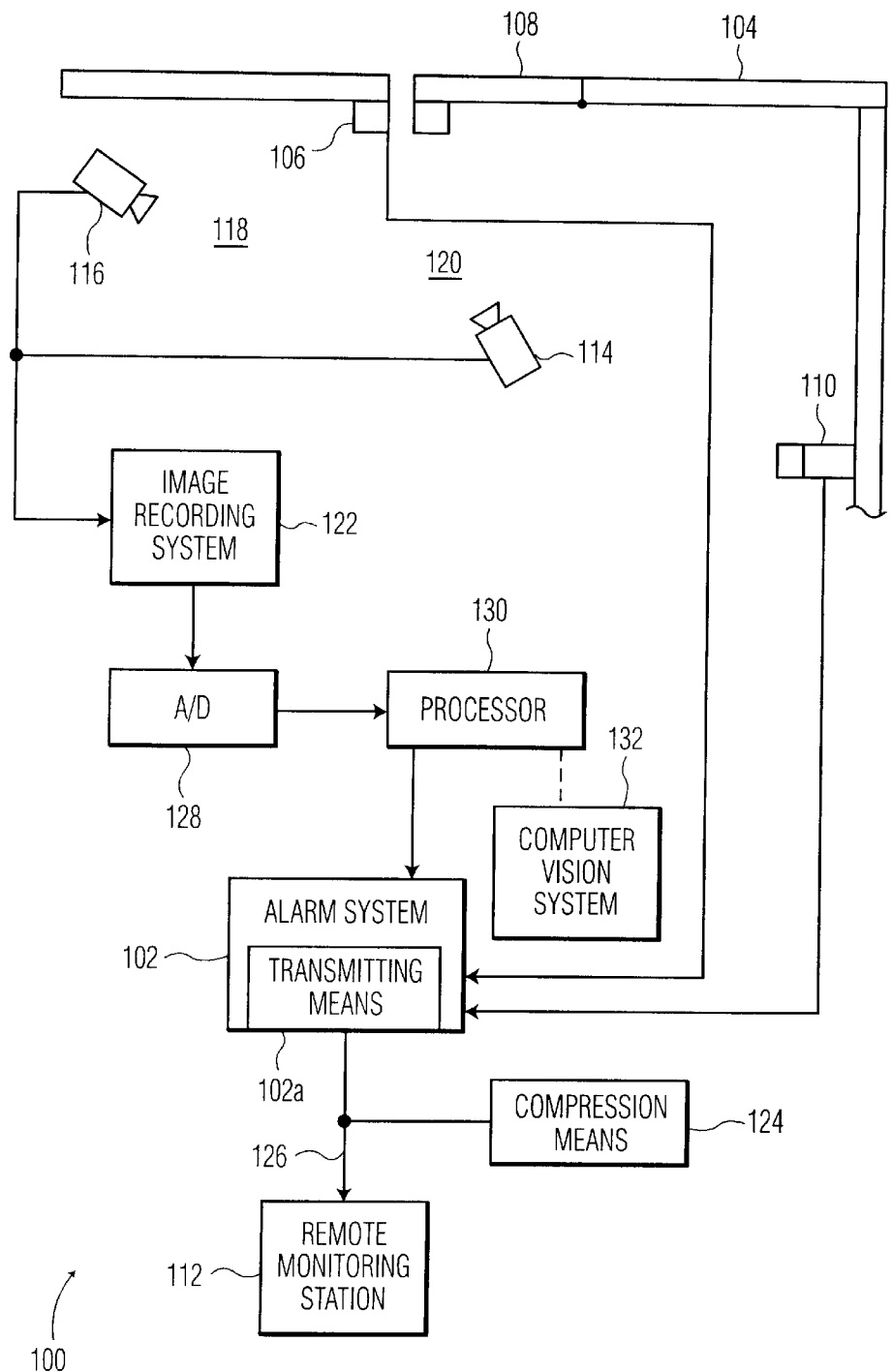
FIG. 1 illustrates a schematical view of a structure having the security monitoring system of the present invention.

Referring now to FIG. 1, there is illustrated a preferred implementation of a security monitoring system of the present invention, referred to generally by reference numeral 100. The security monitoring system comprises an alarm system 102 having means for detecting an unauthorized individual in a structure 104. Such means can be any conventional detectors known in the art, such as magnetic door contacts 106 for detecting the opening of an entrance door 108 or an infrared motion detector 110 appropriately positioned to detect the presence of an unauthorized intruder. Those skilled in the art will recognize that any such type of conventional detectors may be used without departing from the scope or spirit of the present invention.

If the alarm system 102 is triggered an alarm is sounded and/or an alarm signal is transmitted to a remote monitoring station 112 or a local police station (hereinafter both are referred to as a "remote monitoring station"). As discussed above, many of the alarms turn out to be false alarms in that the triggering of the alarm was unintentional or by an individual who is authorized to be in the structure 104 (e.g., a family member or maid of a residence). The problem with false alarms can be resolved by augmenting the alarm system 102 with at least one camera 114, and preferably, with a set of inexpensive cameras, such as CCTV video cameras 114, 116 for capturing image data of individuals inside and/or outside the structure 104. For those cameras 114, 116 placed in a room 118 of the structure 104, the cameras 114, 116 are preferably placed high in the room 118 and positioned to have as complete a view as possible. For entrance ways 120 it is advisable not to have the camera 114 pointed right at the door 108 unless the camera 114 is equipped with a backlight filter (not shown).

The alarm system 102 is further augmented with means for storing the image data captured by the cameras, such as an image recording system 122 and means to transmit the image data 102a to a remote monitoring station, which is preferably a built-in function of the alarm system 102. It is preferred that the image recording system 122 is preferably a computer or other processor having a storage device such as a hard drive and an image capture card. However, those skilled in the art will recognize that the image recording system 122 can be of any type known in the art without departing from the scope and spirit of the present invention.

Furthermore, a compression means 124 can also be provided to compress the video image data prior to transmission to the remote monitoring station 112. Such compression and transmission means are well known in the art and a detailed description thereof is omitted for the sake of brevity. Compression means 124 can include encoders which compress data according to a standard compression algorithm, such as JPEG (for image data) and MPEG (for video data). Transmission means 102a can include any device such as a modem which transmits data via a data link 126 such as a telephone, ISDN, or coaxial cable line. Upon receipt of the image data, the staff of the remote monitoring station 112 can literally "see" what caused the alarm and can even perform a comparison of an individual who caused the alarm with the individuals authorized to be in the structure 104, as is described in co-pending U.S. patent application Ser. No. 09/908,195 (Docket No. 701609, 13933) which is incorporated herein by its reference.

However, given the limitations on transmission bandwidth, particularly from a residence which typically uses a telephone (POTS) connection, it is practical to only send a few video frames from the video image data to the remote monitoring station 112. The system 100 of the present invention selects a portion of the image data captured by the camera(s) 114, 116 that is more representative of the cause of the alarm being triggered, thereby filtering out image data that is not or may not be conclusive as to the determination at hand, namely, if the alarm is a true or false alarm. Since, the remote monitoring station 112 uses the transmitted image data to make its decision, the selection of what images to transmit is crucial. The transmitted image data should be such as to allow a monitoring operator to quickly decide if the alarm is a true alarm or a false alarm. In the case of video image data, the portion thereof to transmit to the remote monitoring site is one or more video frames from the video image data.

To make the selection of what video frame(s) to transmit, the system 100 of the present invention first digitizes the video image data (if not already digitized) in an analog to digital (A/D) converter 128 and feeds the digitized video image data to a processor 130, which can be or include a computer vision system 132. The processor 130 analyzes the digitized video image data and decides what portion (i.e., video frames) to transmit based on a set of predetermined criteria. Of course, the set of predetermined criteria can comprise of a single criteria. If the alarm system 102 has several monitoring zones, with one or more cameras per zone, the criterion to be used can simply be to compress and transmit the image data from the zone that triggered the alarm. Similarly, if a video motion detection scheme is used, then only the video image data from cameras that trigger a motion detection alarm is compressed and transmitted to the remote monitoring station 112.

A more sophisticated set of criteria can include using an established background subtraction technique to eliminate parts of the video frames from previous video frames that represent a background scene leaving a set of regions which has changed from the background scene. There are many approaches known in the art to do this, such as that disclosed in A. Elgammal et al., Non-Parametric Model for Background Subtraction, presented at Int. Conf. Computer Vision & Pattern Recognition, Workshop on Motion, Fort Collins Colo, June 1999.

Background subtraction provides as output a set of regions of the video frame that contain potential intruder images. Some simple approaches can be taken to rank whether a specific video frame from a video camera contains an intruder image of sufficient quality/content to send to the central monitoring station 112. For example, the more centered (in the video frame) the regions detected by background subtraction, the better framed the image shows the intruder, and the better the video frame rates for sending to a monitoring station. Other criteria for rating a video frame in addition to centeredness include, whether one large region versus a set of smaller regions is reported, whether the region shows good contrast, or whether the region is large versus small.

Similarly, face detection can be applied to the region with the use of the computer vision system 132. Such computer vision systems and algorithms are well known in the art, such as that disclosed in H. Rowley et al., *Human Face Detection in Visual Scenes*, Advances in Neural Information Processing Systems 8, 1996, pp. 875–881 and H. Rowley et al., *Rotation Invariant Neural Network-Based Face Detection*, Proceedings of IEEE Conference on Computer Vision and Pattern Recognition, June, 1998. Briefly, such computer vision systems 132 look for skin color among the pixels of the image data (since skin color has a distinctive hue). If a grouping of skin color pixels is above a threshold (i.e., 20% of the image data), the computer vision system concludes that the grouping may be a face. If other criteria are met for the grouping, such as having an elliptical shape and regions which appear to be facial features (e.g., two eyes, a nose, and a mouth), the computer vision system concludes that the grouping of pixels is the face of the unauthorized individual. The more visible the face the better the image ranks. More visible can mean: how much of the face is seen (the more the better), whether the face is turned towards or away, and whether key features such as eyes are visible.

The computer vision system 132 can be used for other image processing techniques to decide which video image data is to be transmitted to the remote monitoring station 112. Such techniques can use the following criteria to select the portion of the video image data to be transmitted to the remote monitoring station, the video frame which is least blurred, the video frame that contains the most skin color information, the video frame that has the best lighting condition on the region of motion or difference, the video frame in which the presence of a person is recognized, etc.

Preferably, a specific time limit is set up around the time of the alarm, for example, a predetermined time before (t1 seconds) and after (t2 seconds) the alarm is triggered. All the video image data from the camera(s) 114, 116 in this time period (t1..t2) are analyzed and given a rank based on a set of predetermined criteria which may include any one or more of the above discussed criteria. The top scoring n video frames are sent to the central monitoring station, where n can be any number. Preferably n=1, i.e., a single video frame is compressed and transmitted to the remote monitoring station 112.

Figure 2:
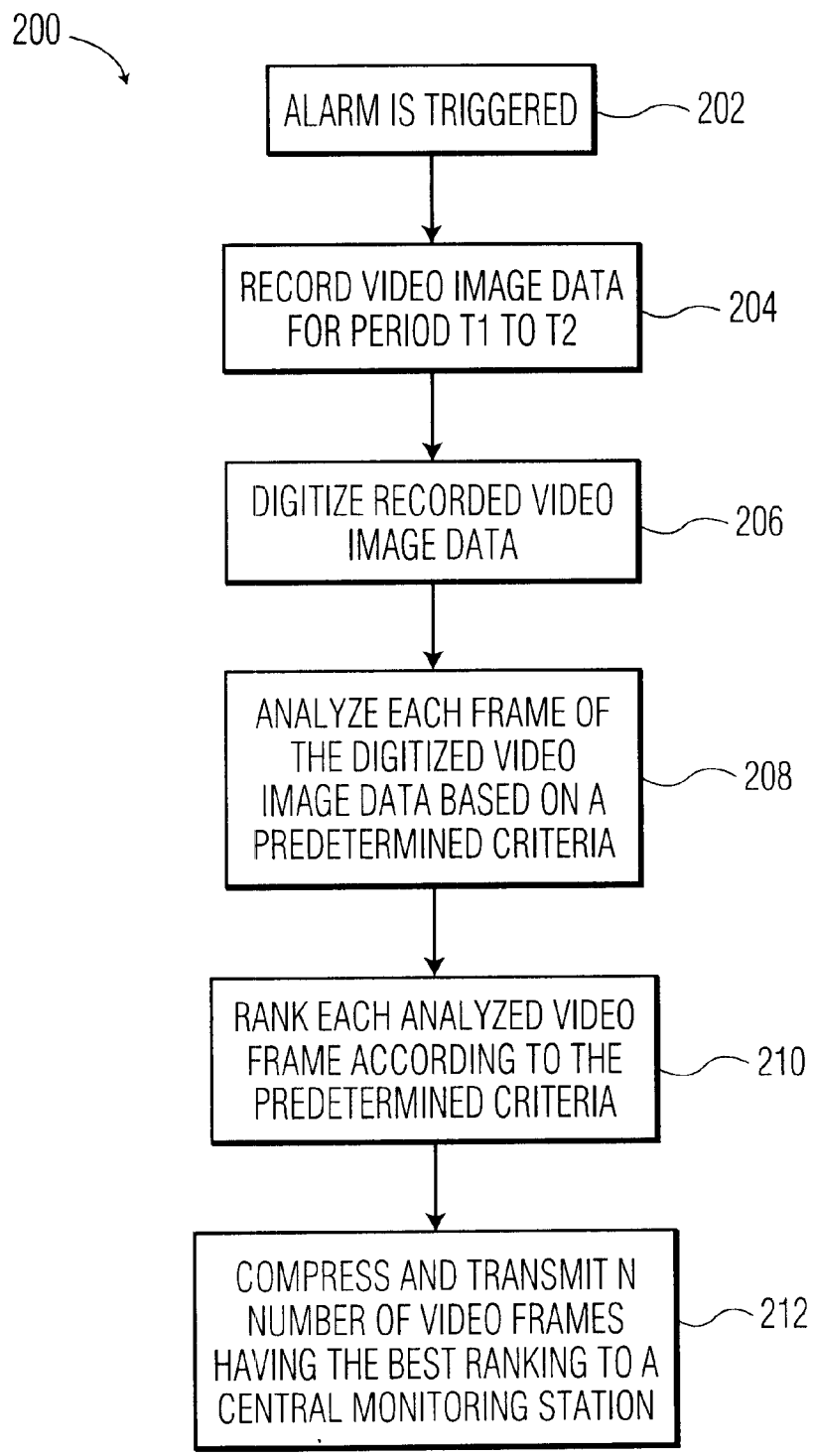
FIG. 2 illustrates a flow chart outlining a preferred method for utilizing the system of FIG. 1.

The methods of the present invention which utilize the preferred implementation of the security monitoring system illustrated in FIG. 1 will now be briefly described with reference to FIG. 2. The method of FIG. 2 being generally referred to by reference numeral 200. At step 202, an alarm is triggered in a structure 104, such as a residence. The alarm is detected by any conventional means known in the art, such as by detectors 106, 110 operatively connected to alarm system 102. At step 204, the image data, preferably video image data, captured by cameras 114, 116 is recorded by the image recording system 122 for a preferred period of t1 to t2, t1 being a period in seconds just prior to the triggering of the alarm and t2 being a period in seconds after the triggering of the alarm.

At step 206, the video image data recorded for the period from t1 to t2 is digitized by the A/D converter 128 and supplied to a processor 130, which may be or include a computer vision system 132. At step 208, the digitized video image data is analyzed by the processor 130 and/or computer vision system 132 according to a set of predetermined criteria, such as any one or more of the criteria discussed above. At step 210, each video frame in the digitized video image data is ranked according to how well it meets the predetermined criteria. At step 212, a predetermined number n of video frames having the best ranking are preferably compressed by the compression means 124 prior to being transmitted by the transmitting means 102a to the remote monitoring station 112. As discussed above, n is preferably 1.

Those skilled in the art will appreciate that the system and methods of the present invention provide the ability to filter out false alarms by transmitting the most useful image from a set of CCTV cameras to a remote monitoring station where the monitoring staff (or local police) can inspect it and make a decision on whether or not the alarm is false.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A security monitoring system comprising:
    an alarm system having means for detection of an alarm in a structure;
    at least one camera for capturing image data inside and/or outside the structure;
    a processor for selecting a subset of the image data upon the occurrence of the alarm based on a set of predetermined criteria; and
    transmission means for transmitting the subset of image data to a remote location, wherein the processor is a computer vision system for analyzing the image data according to the predetermined criteria.

2. The security monitoring system of claim 1, wherein the at least one camera is a video camera, the image data is video image data, and the subset of the image data is at least one video frame of the video image data.

3. The security monitoring system of claim 1, further comprising an image recording system for recording the image data to be analyzed by the computer vision system.

4. The security monitoring system of claim 3, wherein the image data is recorded for a predetermined time period before and after the occurrence of the alarm.

5. The security monitoring system of claim 3, wherein the image data is analog image data, the system further comprising an analog to digital converter for converting the analog image data to digital image data prior to being analyzed by the computer vision system.

6. The security monitoring system of claim 1, further comprising a compression means for compressing the subset of the image data prior to transmission to the remote location.

7. The security monitoring system of claim 1, wherein the transmission means is a modem for transmitting the subset of image data to a remote location over a data link operatively connected to the modem and the remote location.

8. The security monitoring system of claim 1, wherein the at least one camera is a video camera, the image data is video image data, and the subset of the image data is at least one video frame of the video image data, wherein the processor ranks each video frame from the image data according to how well each video frame meets the predetermined criteria and the transmission means transmits a predetermined number of video frames having the best rank to the remote location.

9. The security monitoring system of claim 1, wherein the at least one camera is a video camera, the image data is video image data, and the subset of the image data is at least one video frame of the video image data, wherein the processor subtracts an established background from each video frame resulting in a difference region, and wherein the predetermined criteria are selected from a group consisting of: how centered the difference region is in the video frame; how large the difference region is in the video frame; whether the difference region consists of a large difference region or a group of smaller difference regions in the video frame; the contrast of the difference region in the video frame; the lighting condition on the difference region in the video frame; and whether a face is detected in the difference region in the video frame.

10. The security monitoring system of claim 9, wherein if the set of predetermined criteria includes whether a face is detected in the difference region of the video frame, a further set of predetermined criteria is selected from a group consisting of: how much of the face is visible in the video frame; whether the face is turned towards or away from the video frame; and whether key features of the face are visible in the video frame.

11. The security monitoring system of claim 1, wherein the at least one camera is a video camera, the image data is video image data, and the subset of the image data is at least one video frame of the video image data, and wherein the predetermined criteria are selected from a group consisting of: whether the video frame is blurred; how much skin color is contained in the video frame; if a person is recognized in the video frame; and the lighting condition on a region of motion in the video frame.

12. A method for monitoring a structure, the method comprising the steps of:
    detecting an alarm in the structure;
    capturing image data inside and/or outside the structure;
    analyzing the image data using a computer vision system according to a predetermined criteria;
    selecting a subset of the image data upon the occurrence of the alarm based on a result from the analyzing; and
    transmitting the subset of image data to a remote location.

13. The method of claim 12, further comprising the step of recording the image data.

14. The method of claim 13, wherein the recording step comprises recording the image data for a predetermined time period before and after the occurrence of the alarm.

15. The method of claim 13, wherein the image data is analog image data, the method further comprising the step of converting the analog image data to digital image data.

16. The method of claim 12, further comprising the step of compressing the subset of the image data prior to transmission to the remote location.

17. The method of claim 12, wherein the image data is video image data and the subset of the image data is at least one video frame of the video image data, wherein the method further comprises the step of subtracting an established background from each video frame resulting in a difference region, and wherein the predetermined criteria are selected from a group consisting of: how centered the difference region is in the video frame; how large the difference region is in the video frame; whether the difference region consists of a large difference region or a group of smaller difference regions in the video frame; the contrast of the difference region in the video frame; the lighting condition on the difference region in the video frame; and whether a face is detected in the difference region in the video frame.

18. The method of claim 17, wherein if the predetermined criteria includes whether a face is detected in the difference region of the video frame, a further set of predetermined criteria are selected from a group consisting of: how much of the face is visible in the video frame; whether the face is turned towards of away from the video frame; and whether key features of the face are visible in the video frame.

19. The method of claim 12, wherein the image data is video image data and the subset of the image data is at least one video frame of the video image data, and wherein the set of predetermined criteria are selected from a group consisting of: whether the video frame is blurred; how much skin color is contained in the video frame; if a person is recognized in the video frame; and the lighting condition on a region of motion in the video frame.

20. A method for monitoring a structure, the method comprising the steps of:
    detecting an alarm in the structure;
    capturing image data inside and/or outside the structure;
    selecting a subset of the image data upon the occurrence of the alarm based on a set of predetermined criteria; and
    transmitting the subset of image data to a remote location, wherein the image data is video image data and the subset of the image data is at least one video frame of the video image data, wherein the method further comprises the step of ranking each video frame from the image data according to how well each video frame meets the predetermined criteria and the transmission means transmits a predetermined number of video frames having the best rank to the remote location.

* * * * *